United States Patent
Rainero (10) Patent No.: US 9,383,946 B2
(45) Date of Patent: Jul. 5, 2016

(54) PROVIDING REDUCED AND NON-PRINT OPTIONS USING PRINT

(71) Applicant: Xerox Corporation, Norwalk, CT (US)

(72) Inventor: Emil Victor Rainero, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 23 days.

(21) Appl. No.: 13/862,578

(22) Filed: Apr. 15, 2013

(65) Prior Publication Data

US 2014/0307274 A1 Oct. 16, 2014

(51) Int. Cl.
*G06F 3/12* (2006.01)

(52) U.S. Cl.
CPC ............ *G06F 3/1204* (2013.01); *G06F 3/1219* (2013.01); *G06F 3/1253* (2013.01); *G06F 3/1275* (2013.01); *G06F 3/1285* (2013.01); *G06F 3/1273* (2013.01); *G06F 2206/1512* (2013.01)

(58) Field of Classification Search
CPC ... G06F 3/1204; G06F 3/1203; G06F 3/1285; G06F 3/1275; G06F 3/1253; G06F 3/1219; G06F 3/1273; G06F 2206/1512
USPC ................................................ 358/1.13, 1.15
See application file for complete search history.

(56) References Cited

U.S. PATENT DOCUMENTS

| | | | |
|---|---|---|---|
| 6,032,004 A | 2/2000 | Mirabella, Jr. et al. | |
| 6,459,860 B1 | 10/2002 | Childers | |
| 7,256,901 B2 | 8/2007 | Ferlitsch | |
| 7,872,771 B2 | 1/2011 | Kojima et al. | |
| 2004/0008360 A1* | 1/2004 | Ankrum | B41J 2/17503 358/1.13 |
| 2004/0190057 A1* | 9/2004 | Takahashi et al. | 358/1.15 |
| 2006/0017948 A1 | 1/2006 | Levin et al. | |
| 2006/0221372 A1 | 10/2006 | Onishi et al. | |
| 2008/0109270 A1* | 5/2008 | Shepherd et al. | 705/7 |
| 2008/0259379 A1* | 10/2008 | Shepherd | G06Q 10/06 358/1.15 |
| 2009/0225346 A1 | 9/2009 | Tokuda | |
| 2011/0119104 A1 | 5/2011 | Levine et al. | |
| 2014/0160520 A1* | 6/2014 | Bloch et al. | 358/1.15 |

FOREIGN PATENT DOCUMENTS

| | | |
|---|---|---|
| EP | 1557749 B1 | 3/2010 |
| EP | 2365429 A2 | 9/2011 |

* cited by examiner

*Primary Examiner* — Kent Yip
(74) *Attorney, Agent, or Firm* — Gibb & Riley, LLC (57) ABSTRACT

Methods and systems receive, into computerized device, an instruction to print a document and provide a print driver interface in response to the instruction to print the document, from the computerized device. The methods and systems then automatically record user interaction with the print driver interface and determine an intended use of the document, based on the user interaction with the print driver interface, using the computerized device. The intended use of the document is in addition to an option to print the document. The methods and systems can then automatically print the document and/or electronically share the document based on the intended use of the document, using the computerized device.

20 Claims, 7 Drawing Sheets

PROVIDING REDUCED AND NON-PRINT OPTIONS USING PRINT

BACKGROUND

Systems and methods herein generally relate to printing devices and printing systems, and more particularly to methods and systems that use the print drivers.

A printed document is almost never the user's final goal. For example, a user may print an electronic document to use the hardcopy document to assist in performing the user task (reading the document, signing the document, sending the document to an approver, filing the document, etc). Each time a user considers printing an electronic document, they have a task they are trying to accomplish. Companies want their employees to accomplish their task, but in a cost-effective manner.

SUMMARY

Exemplary methods herein receive, into computerized device, an instruction to print a document and automatically provide a print driver interface in response to the instruction to print the document, from the computerized device. The methods herein then automatically record user interaction with the print driver interface and determine an intended use of the document, based on the user interaction with the print driver interface, using the computerized device. The intended use of the document is in addition to an option to print the document.

When determining the intended use of the document, such methods automatically display the choices of tasks in addition to the option to print the document using a graphic user interface of the computerized device. For example, the choices of tasks in addition to the option to print can include options to print multiple pages on a single sheet, reduce printing supplies when printing the document, use the document in electronic form without printing, etc. The user interaction comprises a selection of one of the choices of tasks that are in addition to the option to print (through the graphic user interface).

The methods herein can automatically present one or more workflows to accomplish the intended use of the document (based on the user interaction with the print driver interface). For example, such workflows can present reduced-printing and non-printing options through questions and answer selections, thus the workflows receive responses to the reduced-printing and non-printing options (using the graphic user interface). Then, such methods can automatically print the document or electronically use/share the document based on the intended use of the document (and/or the information gained through the workflow questions/answers) using the computerized device.

Further, such methods can automatically track user tasks and uses of documents over time based on many instances of the intended uses of such documents, and automatically provide business intelligence data based on such tracking of tasks (using the computerized device). Similarly, such methods can automatically track user tasks and uses of documents over time based on many instances of intended uses of the document for one or more users (e.g., a first user) using the computerized device, and automatically producing custom workflows for common tasks of such a first user, using the computerized device.

Various computerized devices herein include a graphic user interface, a processor operatively connected to the graphic user interface, an input/output device operatively connected to the processor, etc. The processor is operatively (meaning directly or indirectly) connected to a printing engine. The graphic user interface receives an instruction to print a document, and the graphic user interface automatically provides a print driver interface in response to the instruction to print the document.

The processor automatically records user interaction with the print driver interface and automatically determines an intended use of the document, based on the user interaction with the print driver interface. Again, the intended use of the document comprises choices of tasks in addition to an option to print the document. The processor automatically prints the document using the printing engine and/or electronically uses/shares the document through the input/output device (based on the intended use of the document).

The graphic user interface automatically displays the choices of tasks in addition to the option to print the document, and the user interaction comprises a selection of one of the choices of tasks in addition to the option to print the document through the graphic user interface. Additionally, the graphic user interface can automatically present one or more workflows to accomplish the intended use of the document. The workflows occur by having the graphic user interface present reduced-printing and non-printing options, and having the graphic user interface receive responses to the reduced-printing and non-printing options.

Further, the processor can automatically track user tasks and uses of documents over time based on a plurality of instances of the intended use of the document. Thus, the processor can automatically provide business intelligence data based on the tracking of the tasks. Additionally, the processor can automatically produce custom workflows for common tasks of a tracked user.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, each time a user considers printing an electronic document, they have a task they are trying to accomplish. Companies want their employees to accomplish their task, but in a cost-effective manner. Sometimes, the document does not need to be printed using the highest-quality and most expensive process. Instead, sometimes reduced-cost printing options can satisfy the intended task of the user. In some cases printing can be avoided altogether, while still satisfying the intended task of the user. However, conventional print interfaces do not elicit the user's intent, nor do they provide reduced-cost suggestions that the user may find equally attractive as printing.

One form of the systems and methods described herein is a print driver that provides the user with options to perform reduced-cost printing, or to not print at all. The systems and methods herein instead guide the user through one or more Wizards that determine the user's intended task, and from that intended task provide reduced-cost printing or non-printing options that can satisfy the user's intent. Each Wizard is focused on completing a particular user task with a streamlined digital workflow. The set of Wizards is derived from an analysis of why people print.

As mentioned above, each time a user considers printing an electronic document, they have a task they are trying to accomplish. If they decide not to print, the need to accomplish the task does not go away. Companies want their employees to accomplish their task, but in a cost-effective manner. Print governance either enables printing on a lower cost way (monochrome printing, duplex, lower cost device) or prevents printing without helping the user accomplish their task.

Figure 1:
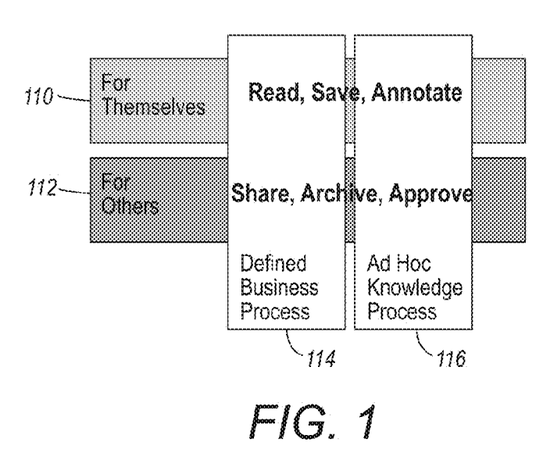
FIG. 1 is a schematic diagram illustrating different intended uses of a printed document according to methods and systems herein.

Some common reasons users print is shown in FIG. 1. The users may intend to use the printed document for themselves (110) to read, save, annotate, etc.; intend to use the printed document for others (112) to share, archive, approve, etc. In addition, these intended uses or tasks can be classified into defined business processes 114, ad hoc knowledge processes 116, etc.

Figure 2:
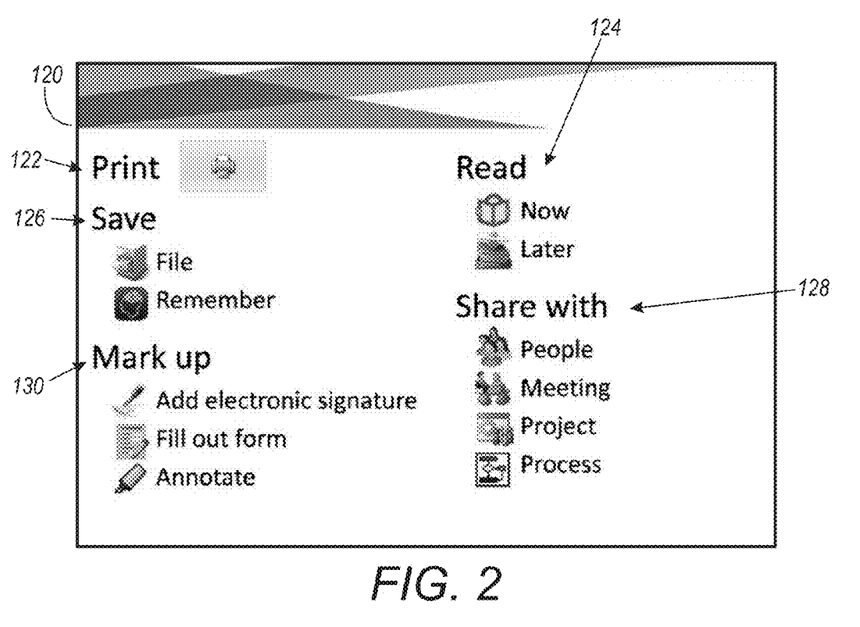
FIG. 2 is a schematic diagram illustrating an exemplary screenshot produced by methods and systems herein.

With systems and methods herein, when the user invokes a print command from within any application, the print driver presents the user with a graphic user interface display, such as item 120 shown in FIG. 2. Those ordinarily skilled in the art would understand that the screenshots and displays illustrated in the attached drawings are only examples and that many different displays could be used by the methods and systems herein. By selecting different options from screen 120, the intended use can be determined. For example, a user's selection of an option will demonstrate that the document is for reading 124 (now or later); to mark up 130 (electronic signature, fill out a form, annotate, etc.); to find items (search or navigate); to save 126 (remember, file, archive, etc.); to share with people 128, share at a meeting, share in a project/activity, share in a process (e.g., approve); etc.

Thus, as shown in FIG. 2, in addition to the basic action "Print", the user is asked what they are trying to accomplish. Based on their selection, the user is then guided to completing their task. For example, if the user intended to print 10 copies of a document to share at an upcoming meeting, when the user sees "Share with . . . Meeting" in item 120 in FIG. 2, they may click on "meeting." They could pick their meeting from their calendar and the system would provide a Wizard to make the document available to all attendees. The particular way the document would be shared with the attendees is could be via email as an attachment, as a shared link to the document in a document management system, or other means.

Figure 3:
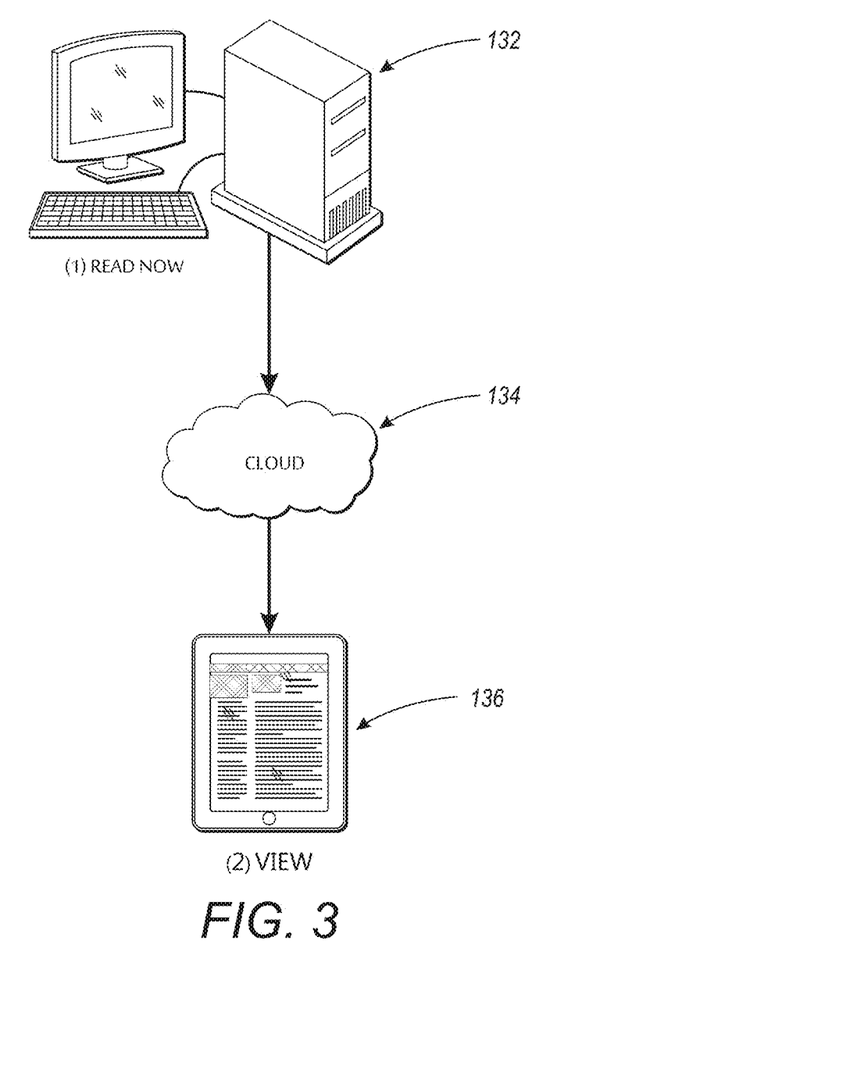
FIG. 3 is a schematic diagram illustrating systems herein.

Further, the systems and methods herein apply workflows across multiple devices, as shown by the example in FIG. 3. In the example in FIG. 3, the user is provided (as an alternative to physically printing sheets) an option to send the item that would otherwise be printed from a computerized device 132 (such as a laptop or desktop computer) to another computerized device 136 (such as tablet device) through a computerized network 134 (such as cloud computing network). The process of sending the print job to the table device 136 wakes up the tablet device 136, which electronically presents the otherwise printed item for reading. Therefore, systems and methods herein apply workflows across multiple devices and tasks can be communicated across a network in lieu of printing.

Figure 4:
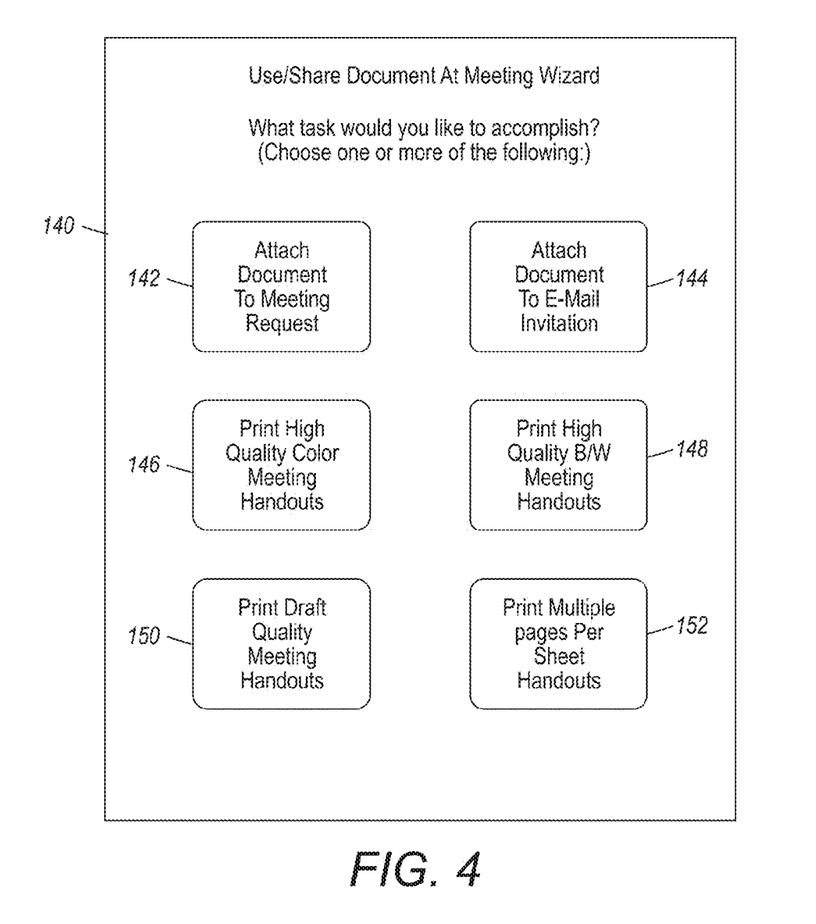
FIG. 4 is a schematic diagram illustrating an exemplary screenshot produced by methods and systems herein.

FIG. 4 illustrates one example of a Wizard that could be displayed in response to a user selecting the "Meeting" option from within the "Share with" options 128 shown in FIG. 2. In FIG. 4, item 140 shows one exemplary display of how the Wizard relating to a meeting could be presented on a graphic user interface. This Wizard 140 could include an option to attach a document to a calendar meeting request (142); an option to attach a document to an e-mail invitation to a meeting (144); an option to print a high-quality version of the meeting handouts (146); an option to print a high-quality black-and-white version of the meeting handouts (148); an option to print a lower quality (draft or regular quality) version of the meeting handouts (150); an option to perform N-up printing (152) where multiple pages of the document are printed on each sheet (each page being printed at a reduced size); etc. When sharing a document with a calendar meeting, the graphical user interface can show the users calendar or upcoming meetings in a list and let the user pick which meeting to share with. Sharing can also include attaching a document to a meeting request, e-mailing a document to all attendees as an attached document, sending a link to all attendees and storing the document in the cloud, etc.

Note that, other than option 146, the remaining options either reduce the amount of print consumables that are used or, in the case of options 142 and 144, potentially eliminate printing altogether. This illustrated that this Wizard (and all Wizards provided by the systems and methods herein) are automatically provided to the user when the user performs no other action other than making a simple printing request. Further, such Wizards of the systems and methods herein automatically guide the user through all steps necessary to accomplish the user's task (such as making the document available for meeting attendees) even if the user is unaware of, or inexperienced at such alternative print options.

Therefore, by automatically providing Wizard options (in FIG. 2); and automatically guiding the user through processes in which the user may not have experience (in FIG. 4) the systems and methods herein are very low in overhead and do not require any training or related costs. Further, by automatically presenting options that may save resources and/or costs (without being asked by the user to do so) resource and cost savings may occur in situations where the user would not otherwise take the initiative to engage in such resource and cost savings operations (either because the user lacks the awareness of the availability of such resource and cost savings, or because the user lacks the knowledge of how to utilize such resource and cost savings options).

Thus, rather than just presenting the user with an instruction to not print (and asking the user to manually perform an operation on a document (save as, email, fax)), the methods and systems herein determine what the user is trying to accomplish with this document (the intended use of the document) then providing a digital Wizard to guide them to complete the task.

By integrating the choice of printing or not printing into the print driver, no overhead is added to existing processes (no feature adds training costs). The systems and methods herein directly ask the user what they are trying to accomplish. Further, by tracking tasks and uses of documents over time within an organization, the systems and methods herein providing business intelligence data to the company around the document intensive activities in their enterprise. Also, when a user chooses a Wizard instead of printing, the systems and methods herein record the transformation of the work from a paper-based activity to a digital activity, and record time savings, cost savings, productivity improvements, green improvements, security improvements, compliance improvements. In addition, a machine learning mode of systems and methods herein can learn the individual user's common activities and provide custom trained workflows for common tasks, further minimizing the users time when accomplishing the task. Further, the user can name the workflows, providing a semantic name for completing the workflow. Also, the workflows can be presented in a list format for selection, for example.

Figure 5:
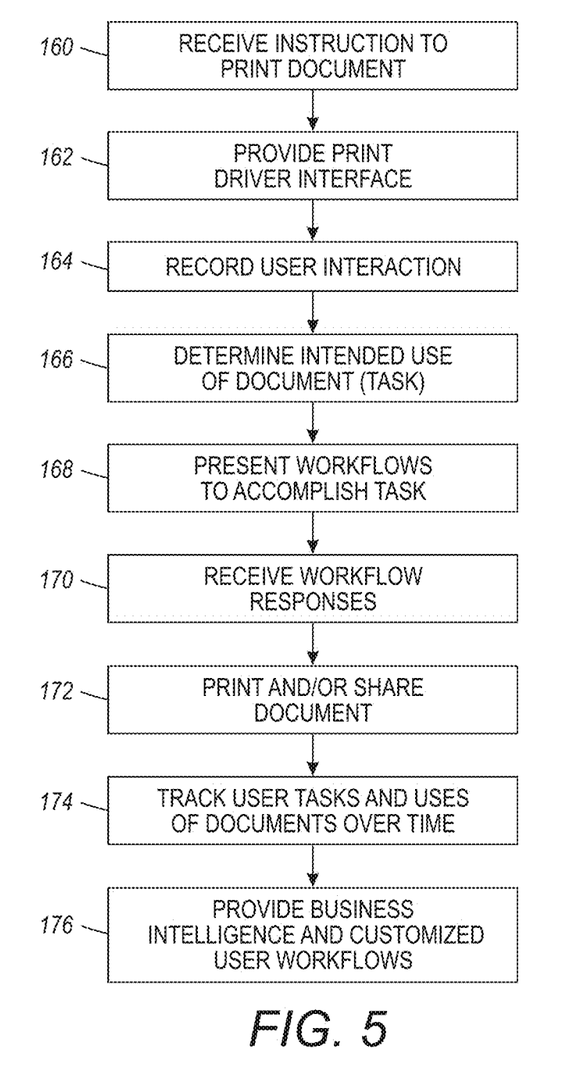
FIG. 5 is a flow diagram illustrating various methods herein.

FIG. 5 is flowchart illustrating exemplary methods herein. In item 160, these methods receive, into computerized device, an instruction to print a document and automatically provide a print driver interface (item 162) in response to the instruction to print the document, from the computerized device. The methods herein then, in item 164, automatically record user interaction with the print driver interface and, in item 166, determine an intended use of the document, based on the user interaction with the print driver interface, using the computerized device. The intended use of the document is in addition to an option to print the document.

When determining the intended use of the document in item 166, such methods automatically display the choices of tasks in addition to the option to print the document using a graphic user interface of the computerized device. For example, as shown in FIGS. 2 and 3 above, the choices of tasks in addition to the option to print can include options to print multiple pages on a single sheet, reduce printing supplies when printing the document, use the document in electronic form without printing, etc. The user interaction comprises a selection of one of the choices of tasks that are in addition to the option to print (through the graphic user interface).

The methods herein can automatically present one or more workflows to accomplish the intended use of the document in item 168 (based on the user interaction with the print driver interface). For example, as shown in FIG. 4 above, such workflows can present reduced-printing and non-printing options through questions and answer selections, thus the workflows receive responses (item 170) to the reduced-printing and non-printing options (using the graphic user interface). Then, such methods can automatically print the document or electronically use/share the document (item 172) based on the intended use of the document (and/or the information gained through the workflow questions/answers) using the computerized device.

Further, such methods can automatically track user tasks and uses of documents over time (item 174) based on many instances of the intended uses of such documents, and automatically provide business intelligence data based on such tracking of tasks (using the computerized device) in item 176. Similarly, in item 176, such methods can automatically track user tasks and uses of documents over time based on many instances of intended uses of the document for one or more users (e.g., a first user) using the computerized device, and automatically producing custom workflows for common tasks of such a first user, using the computerized device.

Figure 6:
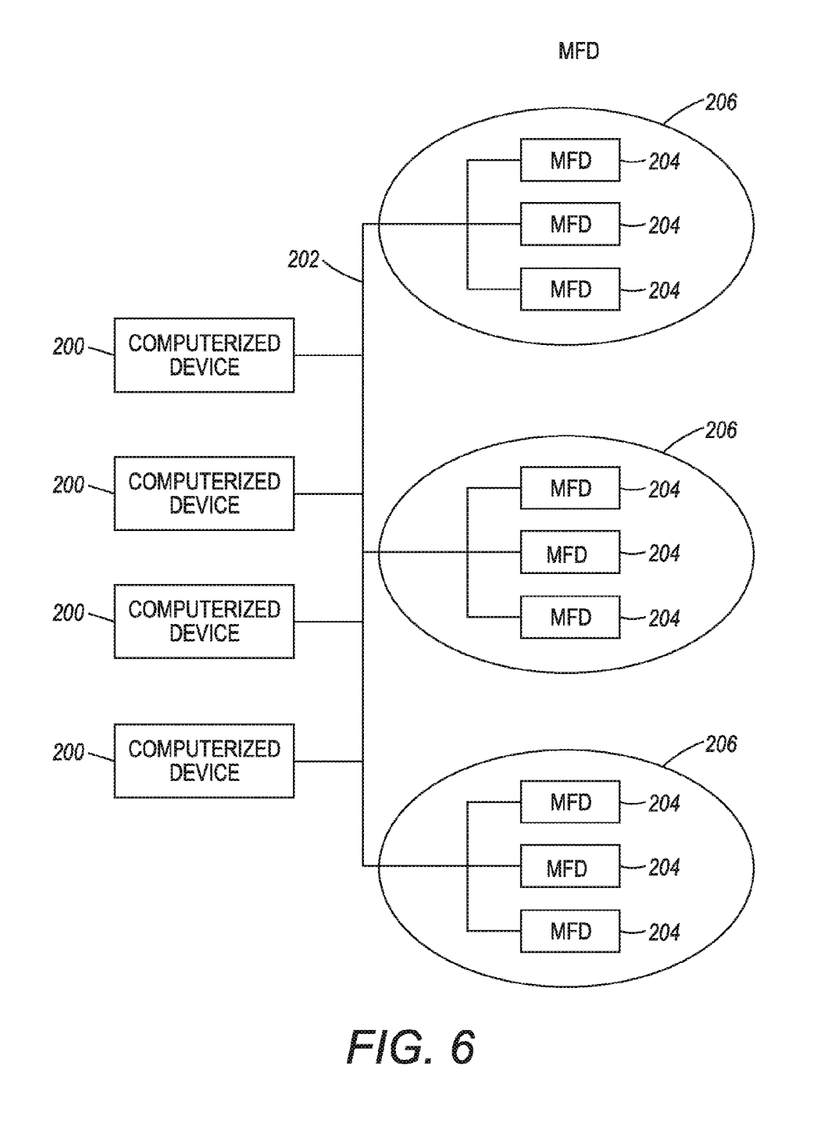
FIG. 6 is a schematic diagram illustrating systems herein.

As shown in FIG. 6, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
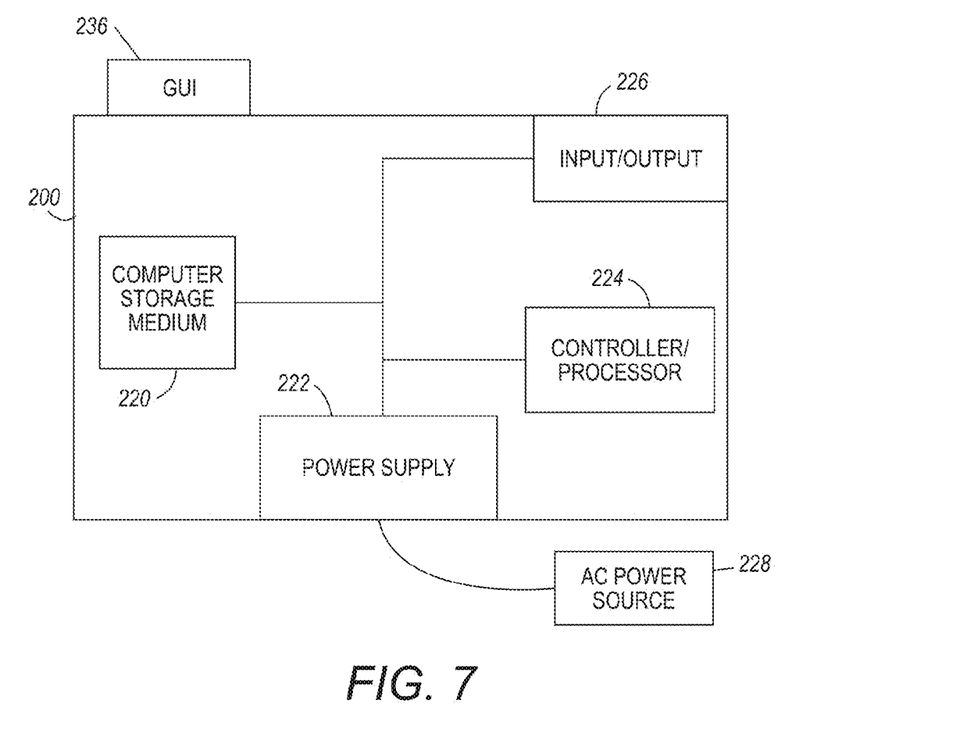
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 206 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 7, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 8:
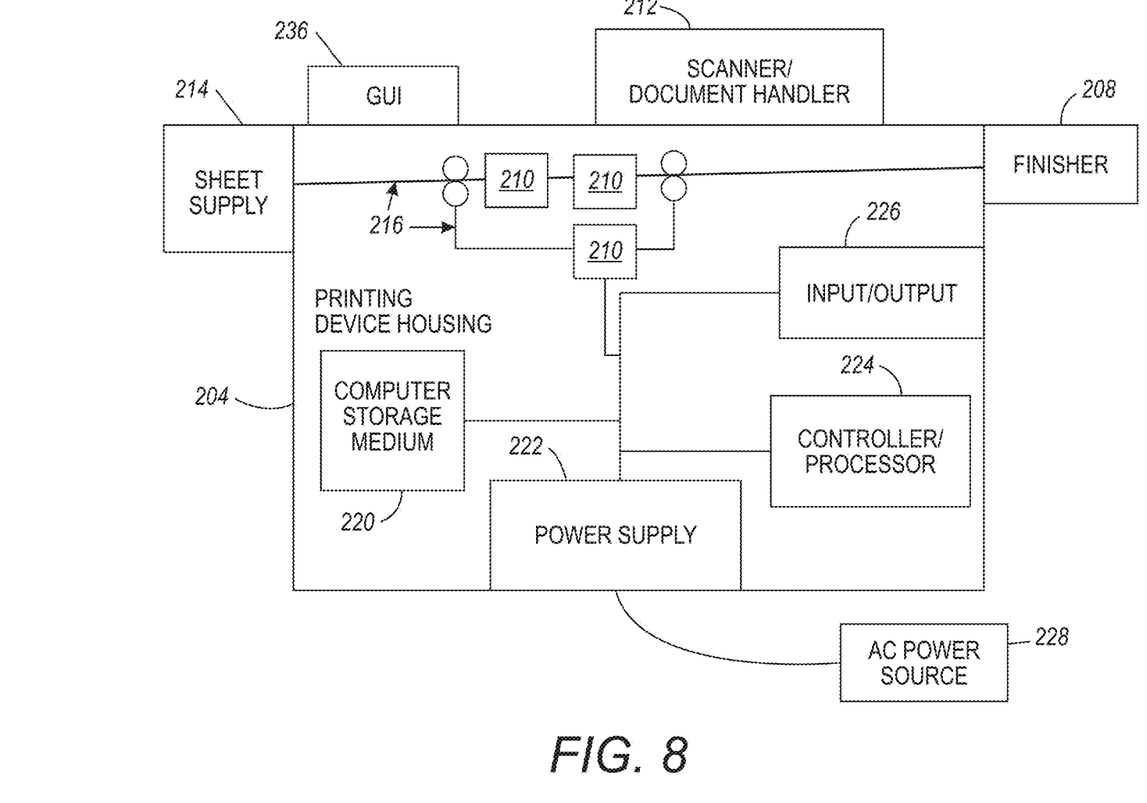
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

The graphic user interface 236 receives an instruction to print a document, and the graphic user interface 236 automatically provides a print driver interface in response to the instruction to print the document.

The processor 224 automatically records user interaction with the print driver interface and automatically determines an intended use of the document, based on the user interaction with the print driver interface. Again, the intended use of the document comprises choices of tasks in addition to an option to print the document. The processor 224 automatically prints the document using the printing engine 210 and/or electronically uses/shares the document through the input/output device 226 (based on the intended use of the document).

The graphic user interface 236 automatically displays the choices of tasks in addition to the option to print the document, and the user interaction comprises a selection of one of the choices of tasks in addition to the option to print the document through the graphic user interface 236. Additionally, the graphic user interface 236 can automatically present one or more workflows to accomplish the intended use of the document. The workflows occur by having the graphic user interface 236 present reduced-printing and non-printing options, and having the graphic user interface 236 receive responses to the reduced-printing and non-printing options.

Further, the processor 224 can automatically track user tasks and uses of documents over time based on a plurality of instances of the intended use of the document. Thus, the processor 224 can automatically provide business intelligence data based on the tracking of the tasks. Additionally, the processor 224 can automatically produce custom workflows for common tasks of a tracked user.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    receiving, into a computerized device, an instruction to print a document;
    automatically providing a print driver interface in response to said instruction to print said document, from said computerized device;
    automatically determining an intended use of said document, based on user interaction with said print driver interface, using said computerized device, said intended use of said document comprising at least one of reading said document, marking up said document, finding items in said document, saving said document, and sharing said document with others;
    based on said intended use of said document displaying user choices of non-printing tasks that are related to said intended use of said document as alternatives to printing said document in addition to an option to print said document, using said computerized device;
    receiving a selection of one of said user choices of non-printing tasks; and
    automatically, instead of printing said document, processing said document based on said selection of one of said user choices of non-printing tasks that are related to of said intended use of said document, using said computerized device.

2. The method according to claim 1, said displaying said user choices of non-printing tasks that are related to said intended use comprising presenting reduced-printing and non-printing options and receiving responses to said reduced-printing and non-printing options using a graphic user interface of said computerized device.

3. The method according to claim 2, said reduced-printing and non-printing options comprising options to: print multiple pages on a single sheet; reduce printing supplies when printing said document; and use said document in electronic form without printing.

4. The method according to claim 1, further comprising automatically tracking tasks and uses of documents over time based on a plurality of instances of said intended use of said document using said computerized device, and automatically providing business intelligence data based on said tracking of said tasks using said computerized device.

5. The method according to claim 1, further comprising automatically tracking tasks and uses of documents over time based on a plurality of instances of said intended use of said document for a first user using said computerized device, and automatically producing custom workflows for common tasks of said first user using said computerized device.

6. A method comprising:
    receiving, into a computerized device, an instruction to print a document;
    automatically providing a print driver interface in response to said instruction to print said document, from said computerized device;
    automatically recording user interaction with said print driver interface, using said computerized device;
    automatically determining an intended use of said document, based on said user interaction with said print driver interface, using said computerized device, said intended use of said document comprising at least one of reading said document, marking up said document, finding items in said document, saving said document, and sharing said document with people;
    based on said intended use of said document displaying user choices of non-printing tasks that are related to said intended use of said document as alternatives to printing said document in addition to an option to print said document, using said computerized device;
    receiving a selection of one of said user choices of non-printing tasks; and
    automatically, instead of printing said document, electronically using said document based on said selection of one of said user choices of non-printing tasks that are related to of said intended use of said document, using said computerized device.

7. The method according to claim 6, said displaying said user choices of non-printing tasks that are related to said intended use comprising presenting reduced-printing and non-printing options and receiving responses to said reduced-printing and non-printing options using a graphic user interface of said computerized device.

8. The method according to claim 7, said reduced-printing and non-printing options comprising options to: print multiple pages on a single sheet; reduce printing supplies when printing said document; and use said document in electronic form without printing.

9. The method according to claim 6, further comprising automatically tracking tasks and uses of documents over time based on a plurality of instances of said intended use of said document using said computerized device, and automatically providing business intelligence data based on said tracking of said tasks using said computerized device.

10. The method according to claim 6, further comprising automatically tracking tasks and uses of documents over time based on a plurality of instances of said intended use of said document for a first user using said computerized device, and automatically producing custom workflows for common tasks of said first user using said computerized device.

11. A computerized device comprising:
a graphic user interface;
a processor operatively connected to said graphic user interface; and
an input/output device operatively connected to said processor,
said processor being operatively connected to a printing engine,
said graphic user interface receiving an instruction to print a document,
said graphic user interface automatically providing a print driver interface in response to said instruction to print said document,
said processor automatically determining an intended use of said document, based on user interaction with said print driver interface, said intended use of said document comprising at least one of reading said document, marking up said document, finding items in said document, saving said document, and sharing said document with people,
based on said intended use of said document said graphic user interface displaying user choices of non-printing tasks that are related to said intended use of said document as alternatives to printing said document in addition to an option to print said document,
said graphic user interface receiving a selection of one of said user choices of non-printing tasks, and
said processor automatically instead of printing said document, processing said document based on said selection of one of said user choices of non-printing tasks that are related to of said intended use of said document.

12. The computerized device according to claim 11, said graphic user interface displaying said user choices of non-printing tasks that are related to said intended use comprising said graphic user interface presenting reduced-printing and non-printing options and receiving responses to said reduced-printing and non-printing options.

13. The computerized device according to claim 12, said reduced-printing and non-printing options comprising options to: print multiple pages on a single sheet; reduce printing supplies when printing said document; and use said document in electronic form without printing.

14. The computerized device according to claim 11, said processor automatically tracking tasks and uses of documents over time based on a plurality of instances of said intended use of said document, and said processor automatically providing business intelligence data based on said tracking of said tasks.

15. The computerized device according to claim 11, said processor automatically tracking tasks and uses of documents over time based on a plurality of instances of said intended use of said document for a first user, and said processor automatically producing custom workflows for common tasks of said first user.

16. A computerized device comprising:
a graphic user interface;
a processor operatively connected to said graphic user interface; and
an input/output device operatively connected to said processor,
said processor being operatively connected to a printing engine,
said graphic user interface receiving an instruction to print a document,
said graphic user interface automatically providing a print driver interface in response to said instruction to print said document,
said processor automatically recording user interaction with said print driver interface,
said processor automatically determining an intended use of said document, based on said user interaction with said print driver interface, said intended use of said document comprising at least one of reading said document, marking up said document, finding items in said document, saving said document, and sharing said document with people,
based on said intended use of said document said graphic user interface displaying user choices of non-printing tasks that are related to said intended use of said document as alternatives to printing said document in addition to an option to print said document,
said graphic user interface receiving a selection of one of said user choices of non-printing tasks, and
said processor automatically instead of printing said document, electronically using said document through said input/output device based on said selection of one of said user choices that are related to of non-printing tasks of said intended use of said document.

17. The computerized device according to claim 16, said graphic user interface displaying said user choices of non-printing tasks that are related to said intended use comprising said graphic user interface presenting reduced-printing and non-printing options and receiving responses to said reduced-printing and non-printing options.

18. The computerized device according to claim 17, said reduced-printing and non-printing options comprising options to: print multiple pages on a single sheet; reduce printing supplies when printing said document; and use said document in electronic form without printing.

19. The computerized device according to claim 16, said processor automatically tracking tasks and uses of documents over time based on a plurality of instances of said intended use of said document, and said processor automatically providing business intelligence data based on said tracking of said tasks.

20. The computerized device according to claim 16, said processor automatically tracking tasks and uses of documents over time based on a plurality of instances of said intended use of said document for a first user, and said processor automatically producing custom workflows for common tasks of said first user.

* * * * *